United States Patent
Bruin et al.

(10) Patent No.: US 11,801,902 B2
(45) Date of Patent: Oct. 31, 2023

(54) AERODYNAMIC MUD FLAP

(71) Applicant: ZF CV SYSTEMS EUROPE BV, Brussels (BE)

(72) Inventors: James Bruin, Rochester Hills, MI (US); James D. Haws, Oakville (CA); Roy Veldhuizen, Rotterdam (NL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 17/574,825

(22) Filed: Jan. 13, 2022

(65) Prior Publication Data
US 2023/0219633 A1 Jul. 13, 2023

(51) Int. Cl.
*B62D 25/16* (2006.01)
*B62D 25/18* (2006.01)

(52) U.S. Cl.
CPC ......... *B62D 25/163* (2013.01); *B62D 25/188* (2013.01)

(58) Field of Classification Search
CPC .... B62D 25/163; B62D 25/16; B62D 25/161; B62D 25/168; B62D 25/18; B62D 25/188
See application file for complete search history.

(56) References Cited

U.S. PATENT DOCUMENTS

| | | | | |
|---|---|---|---|---|
| 817,203 | A * | 4/1906 | Thompson | B62D 25/188 280/154 |
| 2,530,857 | A * | 11/1950 | Campbell | B62D 25/168 280/847 |
| 3,019,031 | A * | 1/1962 | Immel | B62D 25/188 280/851 |
| 3,195,921 | A * | 7/1965 | Robinson | B62D 25/188 298/17 R |
| 3,198,545 | A * | 8/1965 | Mcdaniel | B62D 25/188 280/851 |
| 3,285,624 | A * | 11/1966 | Aber | B62D 25/188 280/851 |
| 3,713,669 | A * | 1/1973 | Evans | B62D 25/188 280/851 |
| 4,103,918 | A * | 8/1978 | Salden | B62D 25/188 16/307 |

(Continued)

FOREIGN PATENT DOCUMENTS

| | | | |
|---|---|---|---|
| CN | 108216381 A | * | 6/2018 |
| EP | 0264766 A1 | * | 4/1988 |

(Continued)

*Primary Examiner* — Steve Clemmons
(74) *Attorney, Agent, or Firm* — WARNER NORCROSS + JUDD LLP

(57) ABSTRACT

An aerodynamic mud flap includes a body having a first lateral side, an opposite second lateral side, an upper end, an opposite lower end, a front face, and an opposite rear face. The body extends in a horizontal, vertical, and transverse directions. The body has a generally planar upper portion extending vertically from the upper end to a horizontal transition line, and an arcuate lower portion extending vertically from the transition line to the lower end. The lower portion is curved along the vertical direction such that the lower end of the body is offset from the upper end in the transverse direction and is disposed rearward of the upper end. A plurality of octagonal openings in the body extend from the front face to the rear face to allow for air flow through the mud flap from the front side to the rear side.

17 Claims, 6 Drawing Sheets

(56) References Cited

U.S. PATENT DOCUMENTS

| | | | | |
|---|---|---|---|---|
| 4,362,310 | A * | 12/1982 | Goodall | B62D 25/188 280/157 |
| 4,378,120 | A * | 3/1983 | Laine | B62D 25/161 280/154 |
| 4,585,243 | A * | 4/1986 | Lockwood | B62D 25/188 280/851 |
| 4,928,994 | A * | 5/1990 | Buchner | B62D 25/188 280/851 |
| 4,964,655 | A * | 10/1990 | Tucker | B62D 25/188 280/851 |
| 5,273,318 | A * | 12/1993 | Nakayama | B62D 25/188 280/851 |
| 5,366,247 | A * | 11/1994 | Fischer | B62D 25/188 280/851 |
| 8,146,949 | B2 * | 4/2012 | Surti | B62D 25/188 280/847 |
| 9,004,538 | B2 * | 4/2015 | Eklund | B62D 25/18 280/847 |
| 9,221,390 | B1 * | 12/2015 | Begley | B62D 35/001 |
| 9,434,419 | B1 * | 9/2016 | Casto, Jr. | B62D 25/182 |
| 10,246,134 | B1 * | 4/2019 | Radyk | B62D 25/18 |
| 10,577,026 | B2 * | 3/2020 | Smith | B62D 25/18 |
| 11,091,207 | B1 * | 8/2021 | Ming | B62D 35/001 |
| 11,155,309 | B2 * | 10/2021 | Morgan | B62D 25/188 |
| 11,325,661 | B2 * | 5/2022 | Bradley | B62D 25/188 |
| 2010/0289243 | A1 * | 11/2010 | Hausmann | B62D 25/168 280/154 |
| 2011/0042932 | A1 * | 2/2011 | Vogel | B62D 25/188 280/154 |
| 2020/0262489 | A1 | 8/2020 | Morgan et al. | |
| 2022/0324519 | A1 * | 10/2022 | Eakmbe | B62D 25/161 |

FOREIGN PATENT DOCUMENTS

| | | | | |
|---|---|---|---|---|
| EP | 0310130 | A1 * | 4/1989 | |
| GB | 2377209 | A * | 1/2003 | B62D 25/16 |
| KR | 200469891 | Y1 * | 11/2013 | |

* cited by examiner

AERODYNAMIC MUD FLAP

FIELD OF THE INVENTION

The disclosure generally relates to vehicle mud flaps and, more specifically, to an aerodynamic mud flap providing drag reduction and reduced lift.

BACKGROUND OF THE INVENTION

Mud flaps are typically installed behind the rear wheels of trucks, tractors, and trailers to impede the rearward projection of dirt and debris toward any vehicle or other object trailing the truck, tractor, or trailer. However, conventional mud flaps increase drag on the vehicle in which they are installed, thereby decreasing fuel economy. With the increasing demand for more fuel efficient and aerodynamic vehicles, a need exists for a mud flap that sufficiently reduces drag. Conventional mud flaps also have a tendency to lift or sail as the flow of air caused by vehicle movement impacts the front facing surface of the mud flap, which decreases the effectiveness of the mud flap in controlling the spray of dirt and debris. Additionally, conventional mud flaps are prone to damage due to external forces exerted when the mud flap impacts a foreign object.

BRIEF SUMMARY

An improved, aerodynamic mud flap is provided that reduces drag and manipulates air flow to promote spray reduction. The improved mud flap also reduces lift/sail, thereby further promoting spray reduction. Additionally, the shape of the improved mud flap reduces the effective frontal area of the flap and reduces the likelihood of damage to the mud flap due to impacts with the front surface of the flap.

In specific embodiments, an aerodynamic mud flap for attachment behind a wheel of a vehicle includes a body having a first lateral side, a second lateral side opposite the first lateral side, an upper end, a lower end opposite the upper end, a front face, and a rear face opposite the front face. The body extends in a horizontal direction from the first lateral side to the second lateral side, in a vertical direction from the upper end to the lower end, and in a transverse direction from the front face to the rear face. The body has a generally planar upper portion extending vertically from the upper end to a horizontal transition line. The body also has an arcuate lower portion extending vertically from the transition line to the lower end. The lower portion is curved along the vertical direction such that the lower end of the body is offset from the upper end of the body in the transverse direction, and the lower end is disposed rearward of the upper end. The body also has a plurality of octagonal openings. The openings extend from the front face of the body to the rear face to allow for air flow through the mud flap from the front side to the rear side.

In particular embodiments, the rear face is concave in the vertical direction.

In particular embodiments, the octagonal openings are disposed about the entirety of the body.

In particular embodiments, a plurality of spaced, vertically extending support ribs extend between the upper end and the lower end.

In certain embodiments, the vertically extending support ribs are evenly spaced from each other in the horizontal direction. The vertically extending support ribs are also tapered from the front face to the rear face. The vertically extending support ribs also bisect the octagonal openings.

In particular embodiments, the arcuate lower portion includes a plurality of spaced, horizontally extending support ribs extending between the first lateral side and the second lateral side.

In certain embodiments, the horizontally extending support ribs are evenly spaced from each other in the vertical direction. The horizontally extending support ribs are also tapered from the front face to the rear face. The horizontally extending support ribs are not disposed in the entire lower portion.

In particular embodiments, two spaced, vertically extending support bosses extend from the upper end to the lower end.

In certain embodiments, the two bosses are symmetrically disposed on either side of a vertical center line extending vertically through the middle of the body.

In particular embodiments, a horizontal hanger extends across and adjacent to the upper end of the body. The hanger is connected to the body and includes at least one mount.

In particular embodiments, an angled hanger extends at an angle in the horizontal and vertical directions between the upper end and one of the first and second lateral sides. The angled hanger also includes at least one mount.

A method of using a mud flap on a vehicle having a tire/wheel assembly is also provided. The method includes providing an aerodynamic mud flap in a mounted position on the vehicle adjacent to the tire/wheel assembly, the mud flap being configured to permit the passage of air flow through the mud flap during vehicle operation to reduce lift of the mud flap, promote laminar flow through the mud flap, and prevent the generation of elevated aerodynamic drag.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
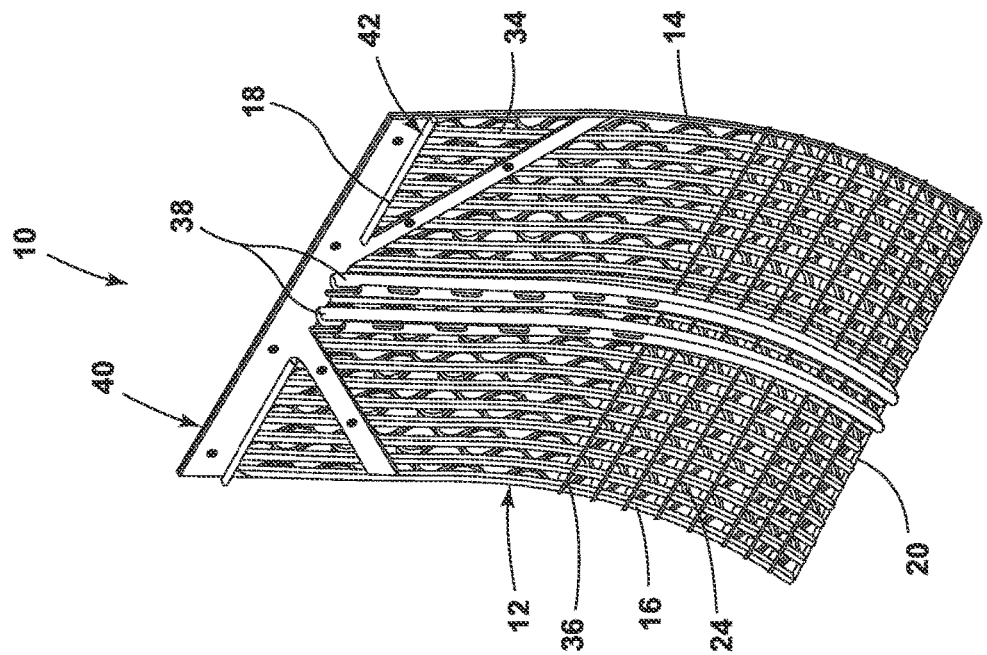
FIG. 1 is a front perspective view of an aerodynamic mud flap in accordance with some embodiments of the disclosure.

An aerodynamic mud flap is provided. Referring to FIGS. 1-9, wherein like numerals indicate corresponding parts throughout the several views, the aerodynamic mud flap is illustrated and generally designated at 10. Certain features of the aerodynamic mud flap 10 are functional, but can be implemented in different aesthetic configurations. The aerodynamic mud flap 10 provides one or more of improved drag reduction, lift/sail reduction, spray control and hence spray reduction, as well as a more robust design that reduces the potential for physical damage to the mud flap itself.

As shown particularly in FIGS. 1-5, the mud flap 10 includes a body 12. The body 12 may be composed of, for example, a polymer material and may be formed by molding as described in more detail below. Thus, the body 12 may be of an integral, single-piece construction. The body 12 has a first lateral side 14, a second lateral side 16 opposite the first lateral side, an upper end 18, a lower end 20 opposite the upper end, a front face 22, and a rear face 24 opposite the front face. The body extends in a horizontal (X) direction from the first lateral side 14 to the second lateral side 16, in a vertical (Y) direction from the upper end 18 to the lower end 20, and in a transverse (Z) direction from the front face 22 to the rear face 24. The body 12 thus has a height that is measured from the upper end to the lower end, a width that is measured from the first lateral side to the second lateral side, and a thickness that is measured from the front face to the rear face, the thickness being much smaller in magnitude than the height and width.

Figure 5:
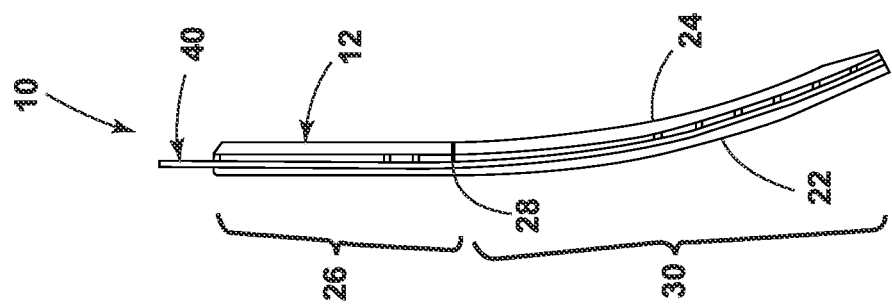
FIG. 5 is a side view of the aerodynamic mud flap of FIG. 1.
Figure 4:
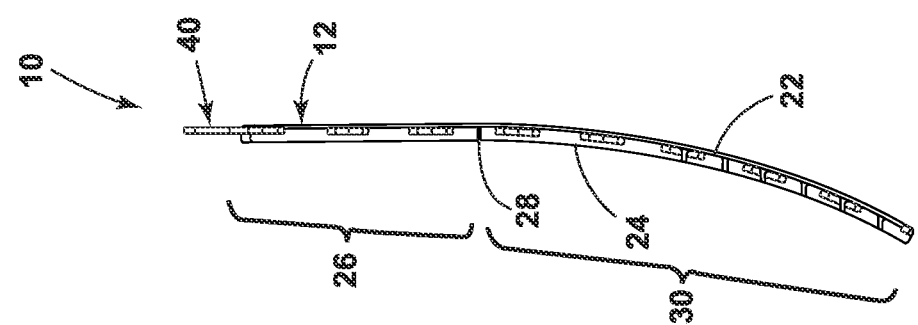
FIG. 4 is a cross-sectional view of the aerodynamic mud flap taken along the line A-A in FIG. 3.

The body 12 has a generally planar upper portion 26 extending horizontally from the first lateral side 14 to the second lateral side 16 and vertically from the upper end 18 to a geometric, horizontal transition line 28 that extends across the body from the first lateral side to the second lateral side. The upper portion 26 generally lies in an X-Y plane as shown in FIGS. 1, 4, and 5. The transition line 28 may be located approximately one-third of the distance from the upper end to the lower end, such that the upper portion 26 may constitute approximately 30% to 40% of the body 12. An arcuate lower portion 30 extends vertically from the transition line 28 to the lower end 20 of the body 12, and horizontally from the first lateral side 14 to the second lateral side 16. The lower portion 30 may therefore constitute approximately 60% to 70% of the body 12. The lower portion 30 is curved along the vertical direction such that the lower end 20 of the body 12 is offset from the upper end 18 of the body in the transverse direction, and the lower end is disposed rearward of the upper end, the rearward direction being the direction faced by the rear face 24. In other words, the lower portion of the body bends rearwardly in the Z-direction as it progresses downwardly from the transition line to the lower end in the Y-direction. Also, the rear face 24 is generally concave in the vertical, Z-direction, and subsequently the front face 22 is generally convex.

The body 12 includes a plurality of octagonal openings 32 each defined by edges forming an octagonal shaped boundary. The void space within the octagonal shaped boundary of the openings 32 extends from the front face 22 to the rear face 24 to allow for air flow through the mud flap 10 from the front side to the rear side. The octagonal openings 32 may be disposed about the entirety of the body 12, and arranged in a honeycomb-like pattern wherein each row of octagonal openings is offset from the adjacent row(s) of openings, and adjacent openings generally touch or contact each other at a boundary edge or point. However, it should be understood that along the outer boundaries of the body defined by the first and second lateral sides 14, 16 and the upper and lower ends 18, 20, the octagonal shape of some of the openings may be truncated by the edges of the body. The octagonal openings provide for minimal impedance of air flow through the mud flap 10 and also lend structural strength to the mud flap.

As shown in FIGS. 1-3, 6, and 7, a plurality of spaced, vertically extending support ribs 34 extend between the upper end 18 and the lower end 20. In the embodiment shown in the drawings, the vertical ribs 34 extend all the way from the upper end to the lower end. However, the vertical ribs 34 may extend partially or mostly between the upper and lower ends. The vertical ribs 34 are also evenly spaced from each other in the horizontal X-direction and also generally parallel, though variation in spacing between the ribs is within the scope of the invention. The vertical ribs 34 bisect the octagonal openings 32. As shown, for example, in FIG. 3, in the vertical direction each individual rib 34 alternates between passing down the middle of an octagonal opening and passing between two adjacent octagonal openings, and so on. The vertically ribs 34 are also tapered from the front face 22 to the rear face 24 as shown particularly in FIG. 8 to promote laminar flow of air through the mud flap 10.

Figure 9:
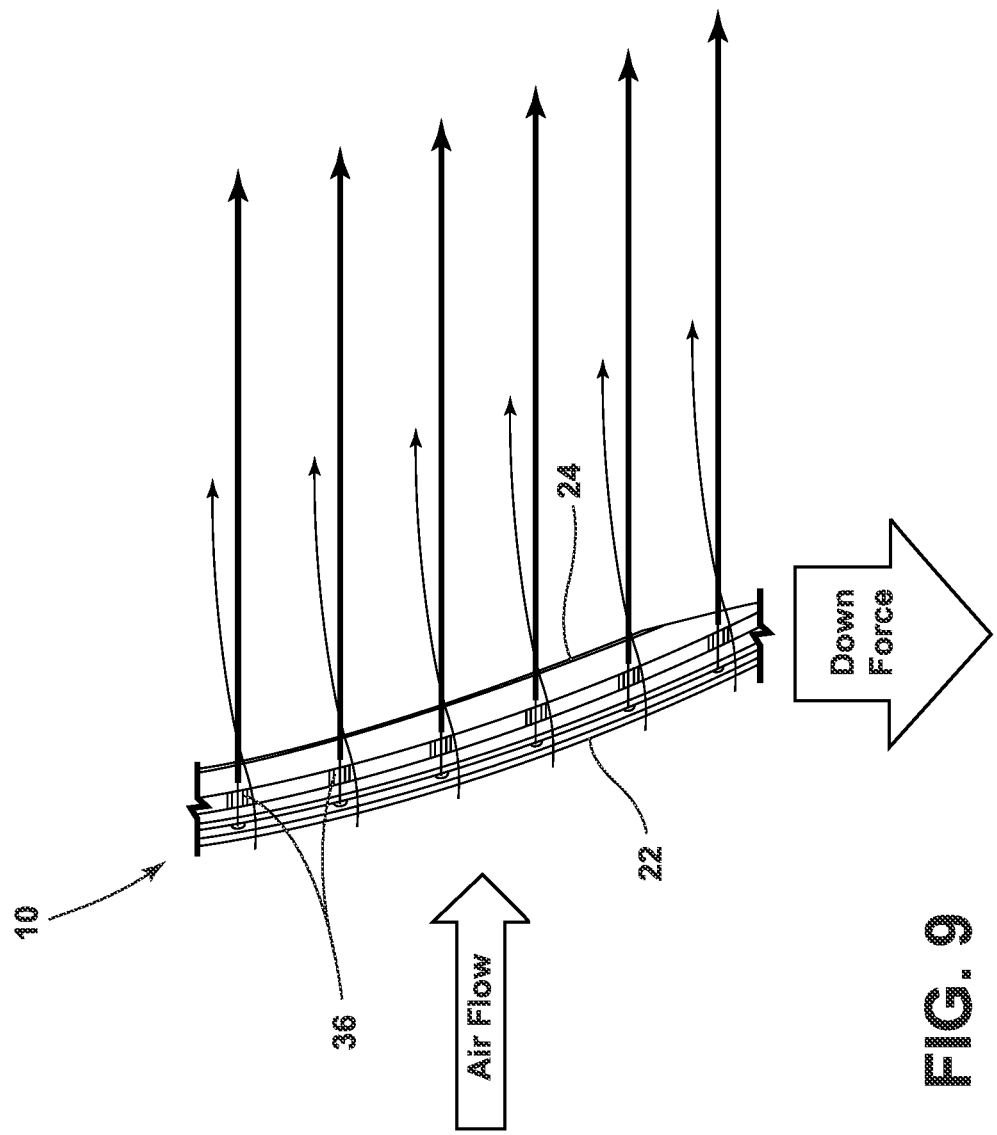
FIG. 9 is a partial side view of the aerodynamic mud flap of FIG. 1 schematically illustrating the flow of air past horizontal ribs of the mud flap.

Similarly, the arcuate lower portion 30 includes a plurality of spaced, horizontally extending support ribs 36 extending between the first lateral side 14 and the second lateral side 16. In the embodiment shown in the drawings, the horizontal ribs 36 extend all the way from the first lateral side to the second lateral side. However, the horizontal ribs 36 may extend partially or mostly between the first and second lateral sides. The horizontal ribs 36 are also evenly spaced from each other in the vertical Y-direction and also generally parallel, though variation in spacing between the ribs is within the scope of the invention. The horizontal ribs 36 are thus also generally perpendicular to the vertical ribs 34. The horizontal ribs 36 bisect the octagonal openings 32. As shown, for example, in FIG. 3, in the horizontal direction each individual rib 36 passes across the middle of a horizontal row of the octagonal openings. The horizontal ribs 36 may not be disposed in the entire lower portion 30 of the body 12, and may only be disposed in a bottom section of the lower portion neighboring the lower end 20. The horizontal ribs 36 are also tapered from the front face 22 to the rear face 24 as shown in FIG. 9 to promote stall of the bottom section of the lower portion 30 of the body 12, thereby reducing lift/sail of the lower portion of the body. Particularly, the flow of air past the tapered, horizontal ribs 36 causes a downward force to be exerted on the lower portion of the body.

Two spaced, flexible, vertically extending support bosses 38 extend from the upper end 18 to the lower end 20. In the embodiment shown in the drawings, the support bosses 38 extend all the way from the upper end to the lower end. However, the support bosses 38 may extend partially or mostly between the upper and lower ends. The two support bosses 38 may be symmetrically disposed on either side of a vertical center line extending vertically through the middle of the body, and may be generally parallel to each other. The two support bosses 38 take the place of two of the vertical ribs 34, and as such each of the bosses may be generally evenly spaced between its adjacent vertical ribs. The support bosses 38 are generally thicker and more substantial than the vertical ribs 34, and the support bosses project more in a rearward direction than the other structural elements of the mud flap 10. The support bosses 38 add structural strength to the body 12 of the mud flap 10, thereby aiding in maintaining the curved shape of the body at higher vehicle speeds (e.g., highway speeds of 55 mph or greater) when the velocity of air contacting and passing through the mud flap is greater. The support bosses 38 are also tapered from the front face 22 to the rear face 24 similar to the vertical ribs 34 to promote laminar flow.

Figure 2:
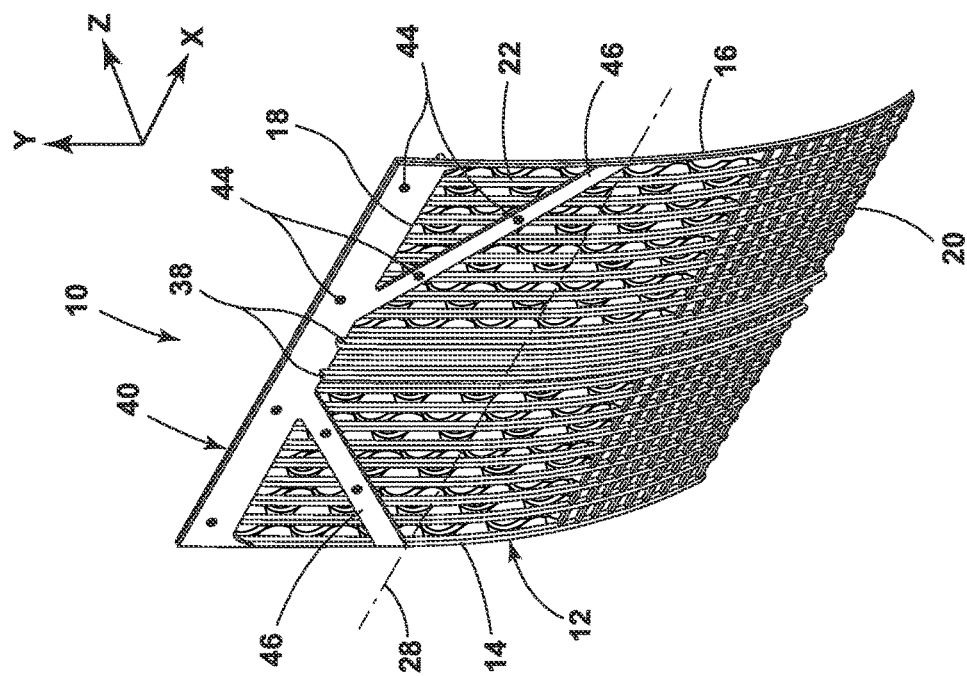
FIG. 2 is a rear perspective view of the aerodynamic mud flap of FIG. 1.
Figure 3:
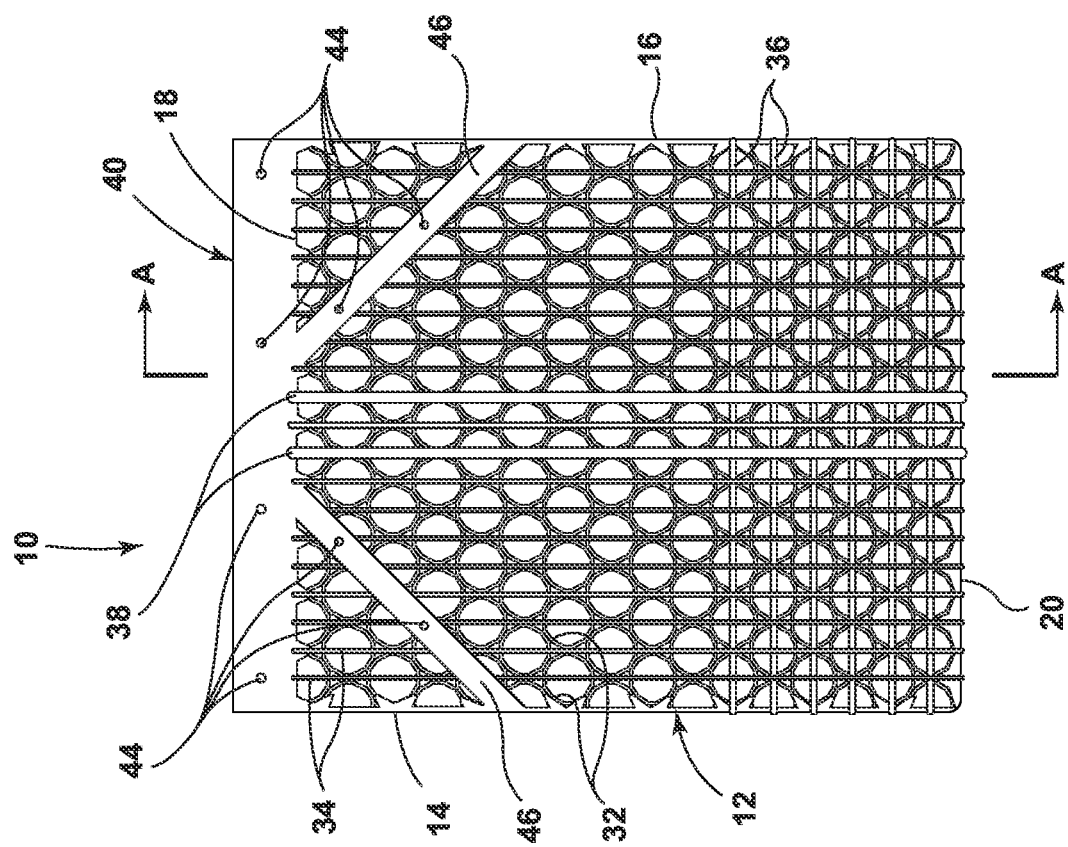
FIG. 3 is a front view of the aerodynamic mud flap of FIG. 1.
Figure 7:
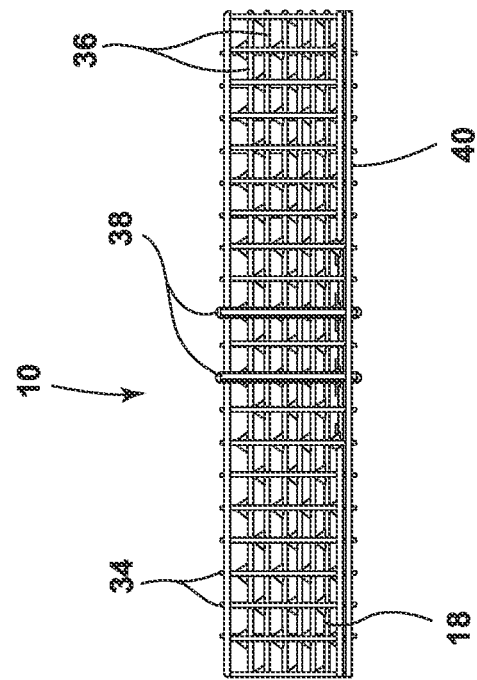
FIG. 7 is a top view of the aerodynamic mud flap of FIG. 1.
Figure 6:
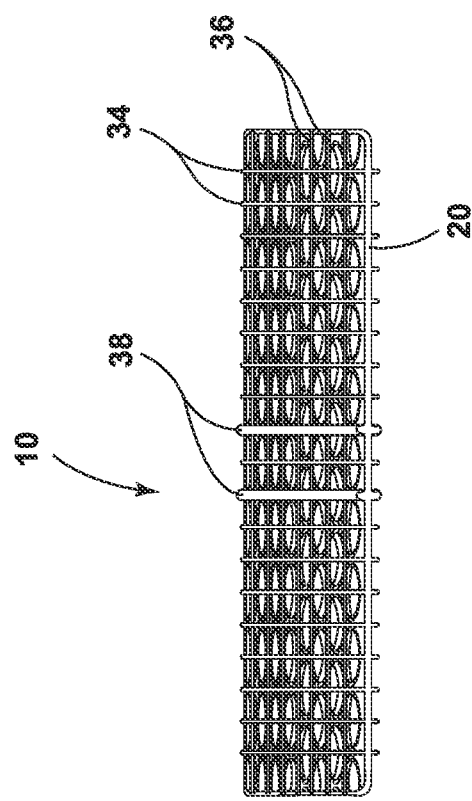
FIG. 6 is a bottom view of the aerodynamic mud flap of FIG. 1.
Figure 8:
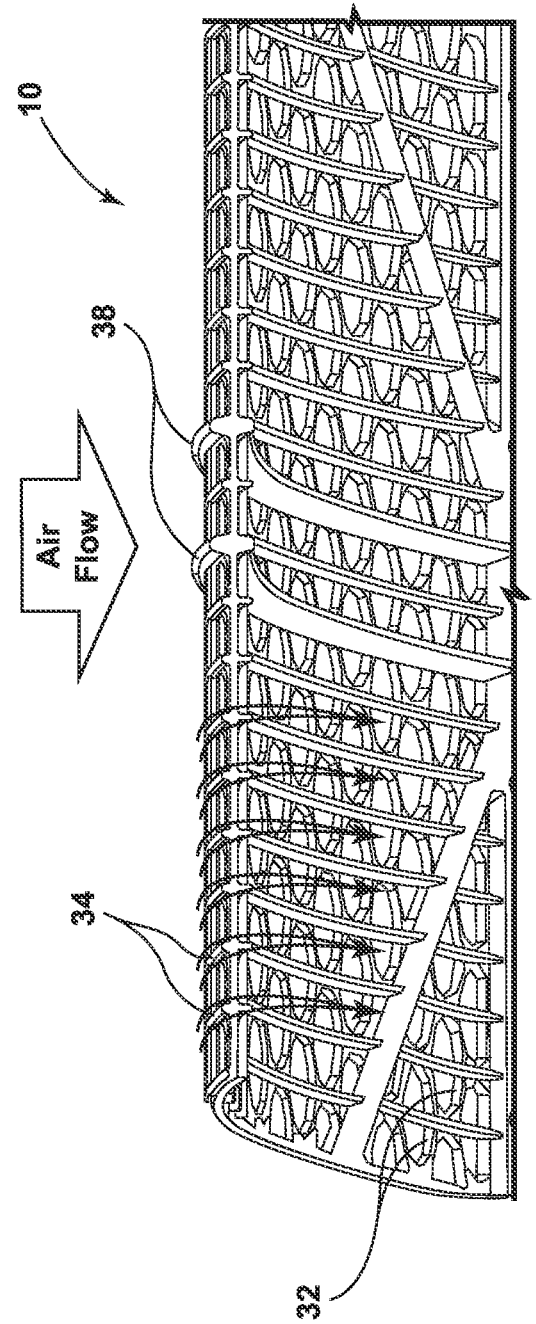
FIG. 8 is a partial bottom perspective view of the aerodynamic mud flap of FIG. 1 schematically illustrating the flow of air past vertical ribs of the mud flap.

A horizontal hanger 40 extends across and adjacent to the upper end 18 of the body 12. The hanger 40 may be, for example, formed of a metal. The hanger 40 is connected to the body 12. Particularly, the body 12 may include a ledge 42 running along and contiguous with the upper end 18, and a top surface of the ledge may be coplanar with a lower edge of the hanger 40. The hanger includes at least one mount 44 and as shown in FIGS. 1-3, may include four mounts that are mounting holes for fasteners such as bolts or the like that fasten the mud flap 10 to a truck, trailer, or other vehicle. The connection of the ledge 42 of the body 12 to the hanger 40 reduces the risk of tearing at the mounting holes during an impact event in which an object forcefully contacts the body of the mud flap. The mud flap 10 may also include an angled hanger 46 extending at an angle (e.g., a 30 degree angle, a 40 degree angle, a 45 degree angle, and the like) in the horizontal and vertical directions between the upper end 18 of the body and one of the first and second lateral sides 14, 16. In the embodiment shown in the drawings, the mud flap 10 includes two angled hangers 46, one on either side of the body, each angled hanger extending from the lower edge of the horizontal hanger 40 to the edge of the body at the lateral sides 14, 16. Each angled hanger 46 includes at least one mount 44, and may, for example, include two mounts. The angled hangers 46 provide for alternative attachment of the mud flap 10 to vehicles having a variety of different mounting structures for mud flaps.

The mud flap 10 may be hung on a mounting bracket or similar mounting structure located behind and generally adjacent to a rear wheel and tire assembly of a vehicle such as a truck, tractor, or trailer. Fasteners such as bolts or the like may be inserted through the mounts 44 and corresponding mounting apertures in the vehicle mounting bracket to connect the mud flap to the vehicle. In the mounted position behind the wheel and tire, the mud flap 10 provides for control reduction of the spray of dirt and debris behind the vehicle. Due to the octagonal shape of the openings and the presence of the vertical and horizontal ribs 34, 36, the mud flap 10 permits the controlled passage of air through the mud flap during vehicle operation to reduce aerodynamic drag caused by the mud flap and reduce lift of the mud flap. Additionally, the curved shape of the mud flap 10 reduces the possibility of damage to the mud flap if and when the mud flap contacts a stationary or moving object such as a curb or foreign object in the roadway.

Figure 10:
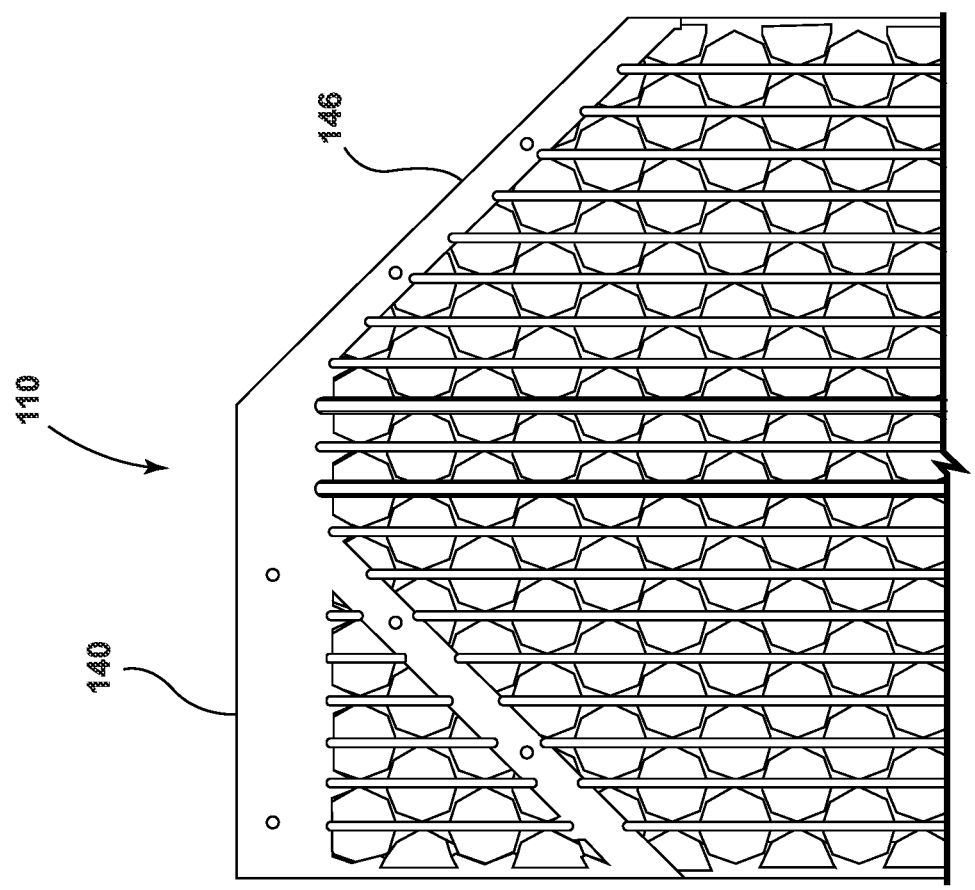
FIG. 10 is a partial front view of an aerodynamic mud flap in accordance with some embodiments of the disclosure.

The various elements of the components of the mud flap 10 described above, e.g. the body 12 and hangers 40, 46, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components or sub-components of the mud flap 10 is monolithic in construction. For example, a mold for forming the mud flap 10, 110 may be modular and may allow for different combination of horizontal and angled hangers as shown in FIGS. 1 and 10. If the hanger is made of a metal, the desired hanger combination may be placed in the mold, and the body of the mold is formed so as to coincide with the specific hanger shape. As shown in FIG. 10, a modular mold that can be conformed to the hanger shape 140, 146 eliminates the need for cutting of the mud flap 110 for angled hanger applications. Alternatively, if the hanger is not made of metal, it may be molded together with the body as a single piece construction.

In general, materials suitable for use in or as the body 12 and hangers 40, 46 include metals (e.g. steels, aluminums, alloys, etc.), resins (e.g. thermoset and/or thermoplastic resins), rubbers/elastomers, and combinations thereof. However, myriad materials may be used to manufacture the elements of the mud flap 10, each typically selected as a function of availability, cost, performance/end use applications, etc. Moreover, metals, metal alloys, rubbers/elastomers, and resins are not exhaustive of suitable materials that may be used. In general, the hangers 40, 46 comprise a metal, such as a steel. However, the hangers may comprise any number of materials suitable for securely mounting the mud flap to a vehicle.

In certain embodiments, the components of the body 12 comprise a resin, such as a thermoplastic and/or thermoset resin. In such embodiments, the components may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the mud flap 10 comprise materials suitable for use under continuous exposure to temperatures of from −40° C. to 120° C., or from −40° C. to 135° C. and/or pressures of from 0.5 to 2 bar. In certain embodiments, one or more, alternatively all, of the various components of the mud flap 10 comprises materials that can withstand up to 30 minutes, alternatively more than 30 minutes, of exposure to temperatures of up to 150° C. without irreversible harmful effects (e.g. melting, etc.).

With regard to composition of the particular components of the mud flap 10 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM);

polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers (TPE), such as polystyrene types, polyolefin types such as an impact modified thermoplastic polyolefin (TPO), polyurethane types, polyester types, polyamide types, polybutadiene types, polyisoprene types, fluoro types, and the like; and copolymers, modifications, and combinations thereof.

With regard to composition of the particular components of the mud flap 10 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, a thermoplastic vulcanizate (TPV), hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, any of the components of the mud flap 10 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. An aerodynamic mud flap for attachment behind a wheel of a vehicle, the mud flap comprising:
   a body having a first lateral side, a second lateral side opposite the first lateral side, an upper end, a lower end opposite the upper end, a front face, and a rear face opposite the front face;
   the body extending in a horizontal direction from the first lateral side to the second lateral side, in a vertical direction from the upper end to the lower end, and in a transverse direction from the front face to the rear face;
   the body having a generally planar upper portion extending vertically from the upper end to a horizontal transition line;
   the body having an arcuate lower portion extending vertically from the transition line to the lower end, the lower portion being curved along the vertical direction such that the lower end of the body is offset from the upper end of the body in the transverse direction and the lower end is disposed rearward of the upper end;
   a plurality of octagonal openings in the body, wherein the openings extend from the front face to the rear face to allow for air flow through the mud flap from the front side to the rear side; and
   a plurality of spaced, vertically extending support ribs extending between the upper end and the lower end, wherein the vertically extending support ribs are tapered from the front face to the rear face.

2. The aerodynamic mud flap of claim 1, wherein the rear face is concave in the vertical direction.

3. The aerodynamic mud flap of claim 1, wherein the octagonal openings are disposed about the entirety of the body.

4. The aerodynamic mud flap of claim 1, wherein the vertically extending support ribs are evenly spaced from each other in the horizontal direction.

5. The aerodynamic mud flap of claim 1, wherein the vertically extending support ribs bisect the octagonal openings.

6. The aerodynamic mud flap of claim 1, including two spaced, vertically extending support bosses extending from the upper end to the lower end.

7. The aerodynamic mud flap of claim 6, wherein the two bosses are symmetrically disposed on either side of a vertical center line extending vertically through the middle of the body.

8. The aerodynamic mud flap of claim 1, including a horizontal hanger extending across and adjacent to the upper end of the body, the hanger being connected to the body and including at least one mount.

9. The aerodynamic mud flap of claim 1, including an angled hanger extending at an angle in the horizontal and vertical directions between the upper end and one of the first and second lateral sides, the angled hanger including at least one mount.

10. A method of using a mud flap on a vehicle having a tire/wheel assembly, the method comprising:
providing a mud flap in a mounted position on the vehicle adjacent to the tire/wheel assembly, the mud flap being configured to permit the passage of air flow through the mud flap during vehicle operation to reduce lift of the mud flap, promote laminar flow through the mud flap, and prevent the generation of elevated aerodynamic drag, the mud flap being the aerodynamic mud flap of claim 1.

11. An aerodynamic mud flap for attachment behind a wheel of a vehicle, the mud flap comprising:
a body having a first lateral side, a second lateral side opposite the first lateral side, an upper end, a lower end opposite the upper end, a front face, and a rear face opposite the front face;
the body extending in a horizontal direction from the first lateral side to the second lateral side, in a vertical direction from the upper end to the lower end, and in a transverse direction from the front face to the rear face;
the body having a generally planar upper portion extending vertically from the upper end to a horizontal transition line;
the body having an arcuate lower portion extending vertically from the transition line to the lower end, the lower portion being curved along the vertical direction such that the lower end of the body is offset from the upper end of the body in the transverse direction and the lower end is disposed rearward of the upper end;
a plurality of octagonal openings in the body, wherein the openings extend from the front face to the rear face to allow for air flow through the mud flap from the front side to the rear side; and
the arcuate lower portion including a plurality of spaced, horizontally extending support ribs extending between the first lateral side and the second lateral side, wherein the horizontally extending support ribs are tapered from the front face to the rear face.

12. The aerodynamic mud flap of claim 11, wherein the horizontally extending support ribs are evenly spaced from each other in the vertical direction.

13. The aerodynamic mud flap of claim 11, including two spaced, vertically extending support bosses extending from the upper end to the lower end.

14. The aerodynamic mud flap of claim 13, wherein the two bosses are symmetrically disposed on either side of a vertical center line extending vertically through the middle of the body.

15. The aerodynamic mud flap of claim 11, including a horizontal hanger extending across and adjacent to the upper end of the body, the hanger being connected to the body and including at least one mount.

16. The aerodynamic mud flap of claim 11, including an angled hanger extending at an angle in the horizontal and vertical directions between the upper end and one of the first and second lateral sides, the angled hanger including at least one mount.

17. A method of using a mud flap on a vehicle having a tire/wheel assembly, the method comprising:
providing a mud flap in a mounted position on the vehicle adjacent to the tire/wheel assembly, the mud flap being configured to permit the passage of air flow through the mud flap during vehicle operation to reduce lift of the mud flap, promote laminar flow through the mud flap, and prevent the generation of elevated aerodynamic drag, the mud flap being the aerodynamic mud flap of claim 11.

\* \* \* \* \*